United States Patent
Furusawa et al.

(10) Patent No.: US 12,316,763 B2
(45) Date of Patent: May 27, 2025

(54) HIGH ASSURANCE VIRTUAL ENCRYPTOR SYSTEM

(71) Applicant: Raytheon Company, Arlington, VA (US)

(72) Inventors: Michael M. Furusawa, Chino Hills, CA (US); Susan N. Gottschlich, Marlborough, MA (US); Torsten A. Staab, Bristow, VA (US)

(73) Assignee: Raytheon Company, Arlington, VA (US)

( * ) Notice: Subject to any disclaimer, the term of this patent is extended or adjusted under 35 U.S.C. 154(b) by 200 days.

(21) Appl. No.: 17/980,958

(22) Filed: Nov. 4, 2022

(65) Prior Publication Data

US 2024/0154809 A1    May 9, 2024

(51) Int. Cl.
*H04L 9/32* (2006.01)
*H04L 9/08* (2006.01)

(52) U.S. Cl.
CPC .......... *H04L 9/3213* (2013.01); *H04L 9/0825* (2013.01); *H04L 9/3247* (2013.01)

(58) Field of Classification Search
None
See application file for complete search history.

(56) References Cited

PUBLICATIONS

Chu et al. Secure Cryptography Infrastructure in the Cloud. 2019 IEEE Global Communications Conference. pp. 1-7 (Year: 2019).*
AlBelooshi et al. Securing Cryptographic Keys in the Cloud: a Survey. IEEE Cloud Computing vol. 3 Issue 4. pp. 42-56 (Year: 2016).*
Zhao et al. Towards a Secure Joint Cloud with Confidential Computing. 2022 IEEE International Conference on Joint Cloud Computing. pp. 79-88 (Year: 2022).*

* cited by examiner

*Primary Examiner* — Jeffrey R Swearingen
(74) *Attorney, Agent, or Firm* — Schwegman Lundberg & Woessner, P.A.

(57) ABSTRACT

Embodiments regard secure virtual encryptor provisioning. A method can include deriving, by a key management system (KMS), virtual encryptor (VE) token data that associates a VE with a user token, signing, by the KMS, a VE executable file, verifying the signature, by a system root of trust (RoT) of a virtual encryptor system (VES), the VE, responsive to verifying signature, loading, by the VES, the executable file on a virtual machine (VM), receiving the user token data from the user device, and executing the VE responsive to determining an operation on a combination of the user token and the token data associated with the VE returns a specified value.

20 Claims, 7 Drawing Sheets

HIGH ASSURANCE VIRTUAL ENCRYPTOR SYSTEM

TECHNICAL FIELD

Embodiments provide an architecture, system, device, and method for a high assurance (HA) virtual encryptor (VE) system that can replace hardware encryptors (HWEs) and can be embedded into secure virtualized processing fabrics of datacenters used by cloud service providers. The HA VE can be used for protecting, managing, and communicating sensitive information without compromising security of the protected information.

BACKGROUND

Current HA network systems used in commercial industry and governments have limited capabilities and are difficult to build, maintain, and obtain approval for use. HA networks are difficult to manage due to requiring specialized HWE devices including network encryptors and End Cryptographic Units (ECUs). HWEs provide confidentiality, identity, and authentication services and contain cryptographic capabilities to perform encryption & decryption, key management, and encryptor management functions. They can have single or multi-channel capabilities and can protect data-at-rest (DAR) or data-in-transit (DIT) at any layer of the open systems interconnection (OSI) model including Layer 1 Link, Layer 2 Ethernet or Layer 3 Internet Protocol (IP) layer. HWEs can include Cross Domain Solution (CDS), Multi-Level Security (MLS), and cybersecurity capabilities. HWEs can take many physical forms such rack-mounted network equipment, handheld communication devices, and radiation-hardened space encryptors, all of which are difficult to integrate into computing fabrics of cloud datacenters due to their physical constraints. Hardware user tokens can be used to provide user identity or key/certificate data stored in smart cards, Crypto Ignition Key (CIK), and other user token devices. HWEs are provisioned with software, credentials, and key material before delivered to the end user and can maintain continuous connections with a network and/or key management system (KMS) for control and key/software updating.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Alternative to a HWE, HWE capabilities can be done securely by virtual encryptors (VEs) implemented in virtual machines (VMs) that run on hypervisors used in datacenters by cloud service providers. This lowers the cost of implementing HWEs, standing up HA network systems, and enables far greater cryptographic services when VEs are embedded directly into the virtualized processing fabrics of datacenters that are not possible using HWEs. Cyber resiliency, zero trust, cloud orchestration, HA key management system (KMS), and physical user tokens produced by the KMS provides a secure virtual environment to protect VE operations and information in any type of cloud datacenter or computing system using virtualization. Virtualization uses software to simulate hardware functionality and allows a network to operate multiple operating systems and applications on a single server. Virtualization also provides economies of scale and greater efficiency than non-virtualized systems. Protected remote enclaves can be connected using HWE or VE. Data shared between enclaves having different classification levels can be provided through Cross Domain Solution (CDS) in multi-tenant cloud systems.

As discussed in the Background, current HA networks for protecting sensitive information have limited capabilities and can depend on HWEs including End Crypto Units (ECUs) that are difficult to maintain and are not suitable for embedding into datacenter virtual processing fabrics. Cloud computing technology solves the deficiencies of current stove-piped HA networks by allowing users to subscribe to HA computing from secure cloud service providers. However, there is no standard HA architecture for securely implementing alternative VEs in cloud datacenters. In this document, HA means the system is meant to protect any level of sensitive information from high value commercial information to highly sensitive government information.

Embodiments provide an architecture of a HA VE system, which aligns with zero trust principles, key and software provisioning, cyber resiliency, and cloud orchestration to provide, protect, and manage the life-cycle of VEs in secure datacenters and computer systems using virtualization. Embodiments support Crypto Modernization 2 (CM2) and Quantum Resistant (QR) algorithm standards. QR algorithms—also known as post-quantum, quantum-secure, and quantum-safe—are cryptographic algorithms that can fend off attacks from quantum computers.

Figure 1:
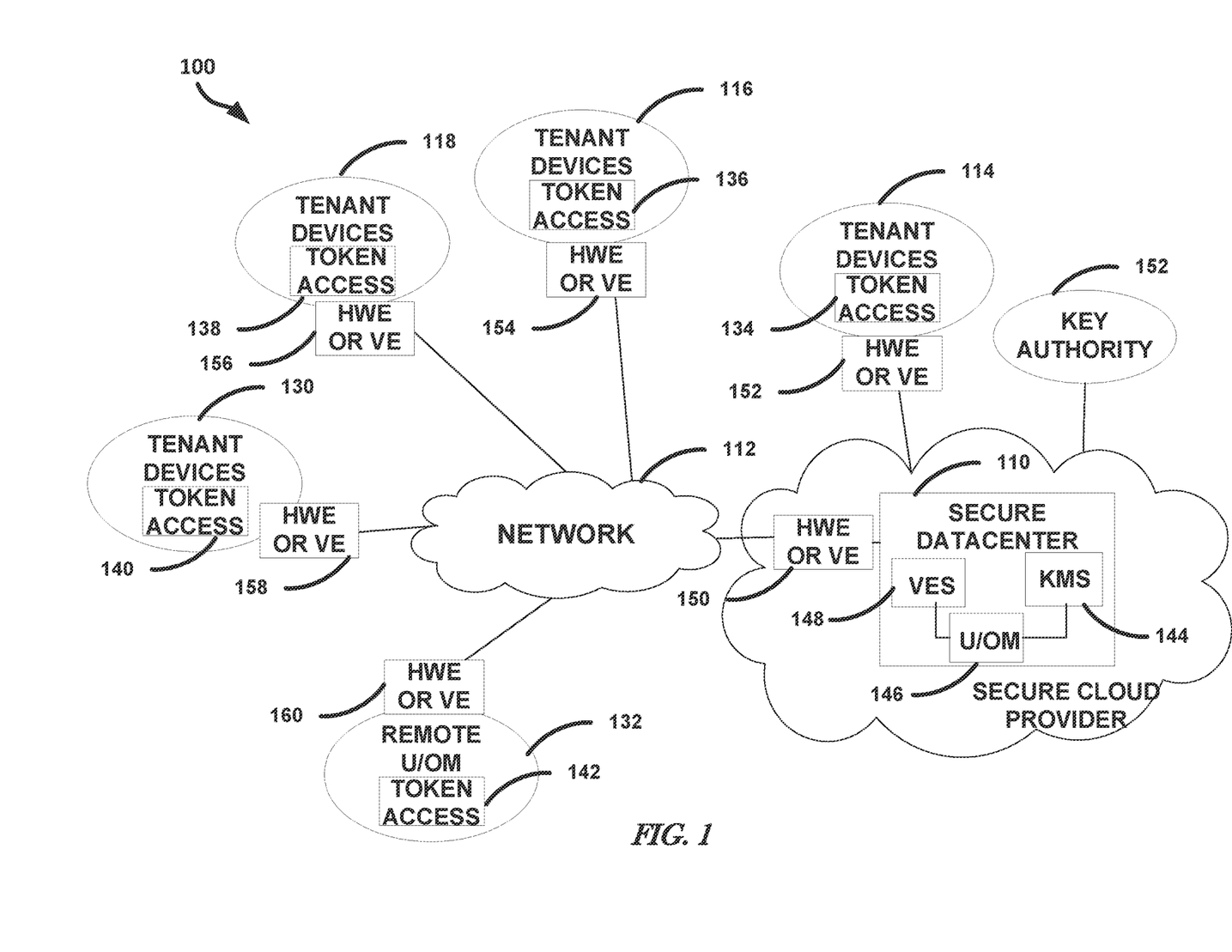
FIG. 1 illustrates, by way of example, a block diagram of an embodiment of an HA virtual encryptor (VE) system.

FIG. 1 illustrates, by way of example, a block diagram of an embodiment of an HA VE system 100. The system 100 as illustrated includes a secure cloud datacenter 110 communicatively coupled to a network 112 and a plurality of remote devices 114, 116, 118, 130, 132 where 132 is for remote management and 114 has a dedicated or direct secure connection. The secure datacenter 110 provides HA VE capabilities that are sufficient for protecting sensitive information. The secure datacenter 110 and its operations are described in more detail regarding FIG. 2. The secure datacenter 110 can provide HA-as-a-service (HAaaS) cloud services that leverage Infrastructure as Code (IAC) and cloud orchestration capabilities to securely provision and operate cyber-resilient VEs at scale. The secure datacenter 110 can include multiple distributed VEs that enable multi-domain and multi-tenant datacenters using CDS and software-defined network (SDN) orchestration of virtual SDN switches and routers. The secure datacenter 110 contains HA crypto-agile and Quantum-safe KMS 148. It also combines continuous, zero trust security-based monitoring and policy enforcement with advanced cyber resiliency and cloud orchestration capabilities.

The secure datacenter 110 has the capability to service multiple tenant private clouds, illustrated as respective individual instances of tenant devices 114, 116, 118, 130, 132. A respective customer associated with the tenant devices 114, 116, 118, 130, 132 each subscribe to services provided by the secure datacenter 110. Each of the tenant devices 114, 116, 118, 130, 132 has a token access device 134, 136, 138, 140, 142, respectively, that manages tokens. The tokens are authentication data that can activate VEs and allow access to services of the secure datacenter 110. Example token access devices 134, 136, 138, 140, 142 are smart cards, CIK, smart phones, or other computing devices.

The secure datacenter 110 can include a hardware KMS 144. The KMS 144 manages user tokens, initialization, provisioning, and disablement, and key materials for accessing and activating VEs that provide encryption functionality. The secure datacenter 110 can include a user and orchestration management system (U/OM) 146. The U/OM 146 includes cloud orchestration software and control software that configures and monitors tamper-resistant, cyber resilient software and zero trust security-focused software executing in a virtual encryption system (VES) 148 to continuously ensure VES-wide integrity and security. The U/OM 146 transfers VES software and key material to a VES 148. The remote U/OM 132 can perform the same configuration and monitoring as the U/OM 146, but not a VES software transfer operation. If available, the U/OM 146 can also utilize quantum networks and Quantum Key Distribution (QKD) schemes (e.g., BB84, B92, and others) as an additional layer of security for VES key distribution.

The VES 148 includes a group of VMs that operate in a secure virtual environment. The VES includes one or more VEs in the VMs that are instantiated on demand by the U/OM 146 and continuously monitored by cyber resilient software 242 (see FIG. 2) and zero trust software 244 (see FIG. 2). VMs provide virtual network functions (VNFs) 272 that can form networks of virtual switches and routers managed by SDN controllers.

Each of the secure data center 110 and the tenant devices 114, 116, 118, 130, 132 can include a respective HWE or VE 150, 152, 154, 156, 158, 160. The HWE or VE is responsible for encrypting and decrypting data, cryptographic key management, and encryptor management. More details regarding a VE is provided in a later FIG.

Figure 2:
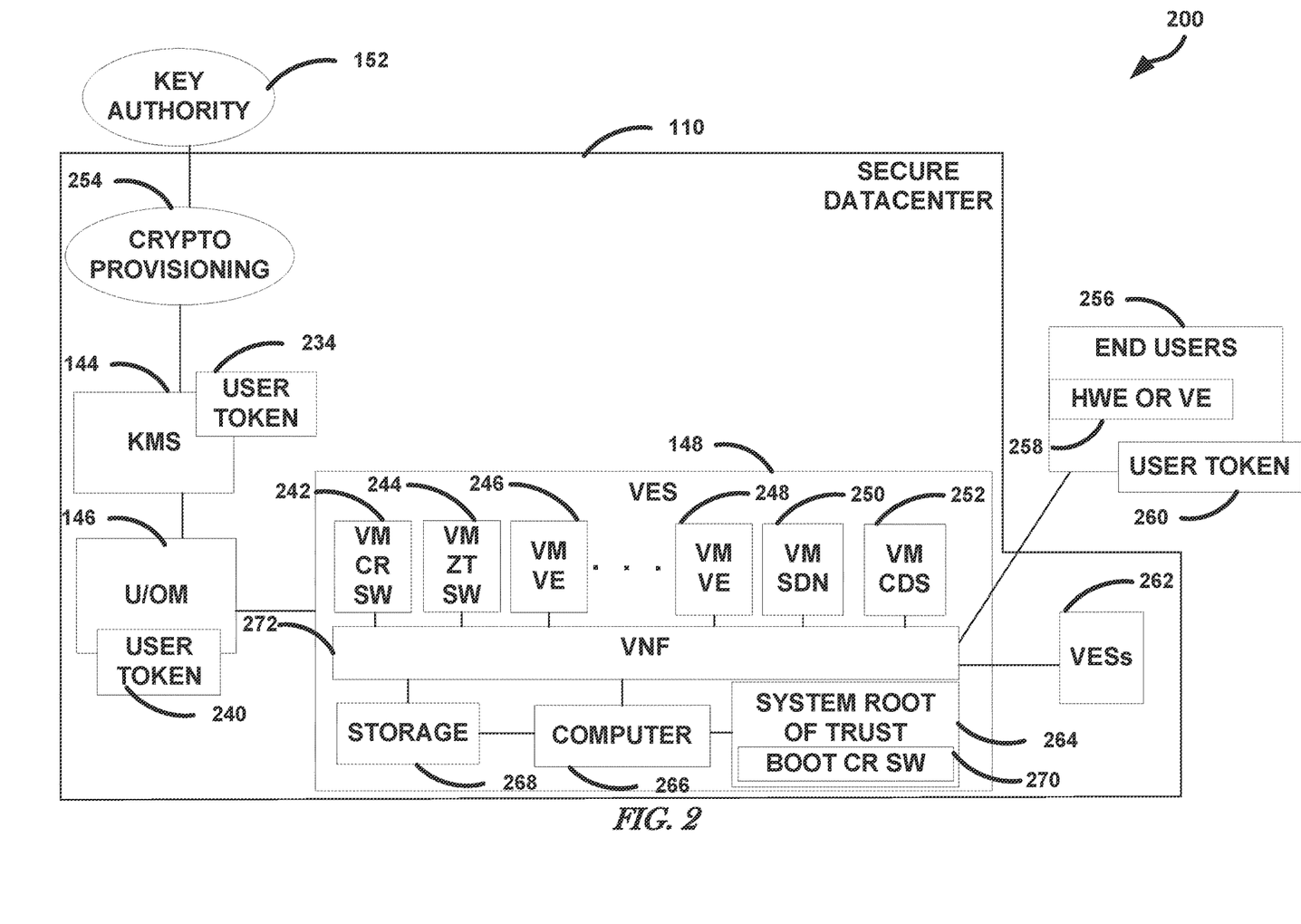
FIG. 2 illustrates, by way of example, a block diagram of an embodiment of a system that includes the secure datacenter of FIG. 1 in more detail.

FIG. 2 illustrates, by way of example, a block diagram of an embodiment of a system 200 that includes the secure datacenter 110 in more detail. The system 200 as illustrated includes an external key authority 152 communicatively coupled securely to the secure datacenter 110. The system 200 as illustrated further includes an end user 256 communicatively coupled securely to the secure datacenter 110. The system 200 as illustrated further includes multiple VESs 262 communicatively coupled securely to one or more other VESs 148 within the datacenter 110.

The key authority 152 provides trust anchors (TAs), seed keys, and other crypto products from a trusted source. The crypto products from the key authority 152 allow the KMS 144 and VES 148 to trust each other and to securely derive mission, infrastructure and initialization keys and other crypto products. An example key authority includes the government's key management infrastructure (KMI).

The KMS 144 performs crypto provisioning operations 254. The crypto provisioning operations 254 program respective user tokens 234, 240, 260 used by the KMS 144, the U/OM 146, and the end user 256, respectively. Each of the user tokens 234, 240, 260 is generated based on a token that is based on one or more shared secret values, credentials, identities, or split keys that are associated or bound to a VE. This is also known as cryptographic binding. A Crypto Ignition Key (CIK) is an example hardware token that stores key splits. The token is a numeric value that is used by the VES 148 to activate a VE 246, 248 and verify whether a request from the end user 256 is legitimate, safe, and to be performed by the VES 148, or is otherwise insecure and not to be performed by the VES 148. The KMS 144 initializes user tokens 234, 240, 260 that are used to access and activate VMs 242, 244, 246, 248, 250, 252.

The VES 148 can operate using an enhanced system (SYS) root of trust (SYS RoT) 264 device that is attached to a computer 266 as a stand-alone or pluggable (e.g., PCIe) hardware security module (HSM), a datacenter-ready control module (DC-SCM), M.2 plug-in module, or other cryptographic device. The SYS RoT 264 enhances the security of the computer or server that provides the virtualization. The zero trust software 244 will continuously use the output of the SYS RoT 264 to detect potential hardware-level or software-level tampering with VES-related infrastructure. An HSM is a physical computing device that safeguards and manages digital keys, performs encryption and decryption functions for digital signatures, and other cryptographic functions. The HSM includes a secure crypto processor chip. The SYS RoT 264 can be a plug-in (a peripheral device coupled to a computer) or an external device coupled to a computer or network server.

The SYS RoT 264 execute cyber resilient software (Boot CR SW) 270 that monitors the integrity of the boot operation of the computer or server. This verifies the bootloader, operating system or hypervisor software is not altered by a cyber attack.

KMS 144 provisions the software contents of the VMs 242, 244, 246, 248, 250, 252. It provisions VEs 246, 248 by configuring cryptographic algorithm/s with initial seed key material and encrypting and signing VE software instances. The KMS 144 can rekey VEs 246, 248, keep records of key material, wraps keys for storage, and send encrypted key and software packages to U/OM 146 to transfer to the VMs 246, 248. The KMS 144 also signs the cyber resilient software (CR SW) 242 and zero trust software 244 (ZT SW) that is installed in one or more of the VMs. The KMS 144 sends mission keys to VEs 246, 248 periodically during operation. Multiple KMS 144 units may be used to support scalability, high availability, and multi-level classifications. The KMS 144 can include a database of the user tokens 234. 240, 260, VM 242, 244, 246, 248, 250, 252 instances, encrypted keys, and other relevant data.

The U/OM 146 utilizes Infrastructure as Code (IaC) services and cloud orchestration capabilities to automate the provisioning, deployment, and maintenance of VES 148. An example cloud orchestration software is Overcast™ from Raytheon Company. The U/OM 146 performs cloud orchestration that launches and deletes software running in the VES 148 and controls connections between cloud datacenters. It also has the ability to live-migrate VE nodes or change the VES 148 network topologies on-the-fly to provide optional moving target defense capabilities. The U/OM 146 controls the ZT SW 244 and CR SW 242, VEs 246, 248, and other software running in the VES 148.

Cloud orchestration automates the tasks to provision VE VMs 246, deploy workloads, manage network visibility, and control user and workload access. Cloud orchestration also automates reclamation of unused capacity and returns it to resource pools. Cloud orchestration technologies integrate automated tasks and processes into a workflow to perform requested functions. Cloud orchestration can validate and/or authenticate VMs 242, 244, 246, 248, 250, 252.

The U/OM 146 can support a wide range of open standard network management software. The U/OM 146 supports a unique combination of complementary cyber resilient and multi-level zero trust sensors and effectors, coupled with advanced, cryptographic resource, data, network, host, and service binding. The U/OM 146 can leverage out-of-band quantum key distribution network to further secure communications. The U/OM 146 can be integrated with IaC and software-defined wide area network (SDWAN) capabilities, such as to enable enterprise-level scalability, mission resiliency, and active defense (e.g., via polymorphic networking & moving target defense) at the same time.

The VES 148 is a secure virtual environment in which software packages execute in VMs. Some of the VMs can operate as virtual encryptors. The VES 148 can execute the cyber resilient software and zero trust software that are controlled or managed by the U/OM 146. The CR SW 242 and the ZT SW 244 operate to protect the VES 148 from a cyber attack.

The VMs 242, 244, 246, 248, 250, 252 are software that operate in a guest machine (software) that runs on a hypervisor (a physical host machine). The VMs 242, 244, 246, 248, 250, 252 can perform virtual encryptor operations ("virtual" because the encryption is performed in a VM).

The U/OM 246 can consist of one or multiple workstations running cloud orchestration, cyber resilient, zero trust, VE management, SDN, and other software applications.

Operations of the VES 148 can be monitored by the cyber resilient software 242. Boot CR SW 270 is running in the SYS RoT 264 for the VES 148 server and monitors boot functions of the VES 148. Boot Shield™ and Electronic Armor™ from Raytheon Company are examples of CR SW 242 and Boot CR SW 270. The VES 248 includes ZT SW 244 that continuously monitors the VES 148 for internal or external cyber attacks. The ZT SW 244 can work hand in hand with the CR SW 242 to detect and fend off common VE host attacks, including insider threats. REDPro ZTX™ from Raytheon Company is an example of ZT SW 244.

The VES 148 can operate using an additional SYS RoT 264. The SYS RoT 264 provides independent, hardware attestation as well as trusted, secure boot capabilities that can decrypt and authenticate its own and a host's bootloader and application software. The SYS RoT 264 performs system integrity, tamper detection, and cryptographic functions and can share its observations with the ZT SW 244 to enable multi-level ZT security enforcement. The SYS RoT 264 can verify signatures (e.g., using standard or QR algorithms) of software used in the VES 148 including host's bootloader, operating system, and hypervisor software. The SYS RoT 264 include a variety of components, such as a security perimeter that defines what needs to be protected on the VES 148, a secure central processing unit (CPU) that runs secure software/firmware, a runtime memory (e.g., a STACK, HEAP and global data as this data will contain keys in plain-text and other sensitive information), tamper resistance (e.g., a dedicated read only memory (ROM) that can only be accessed by the SYS RoT 264, hardware cryptographic accelerators, a True Random Number Generator (TRNG) (e.g., to produce a high level of entropy required for the various security functions), a secure clock or secure counter for a reliable time measurement, secure storage for applications requiring a state knowledge or key management.

The VES 148 is the secure virtual environment that executes the Virtual Encryptors (a subset of the VMs 242, 244, 246, 248, 250, 252) and other VM cyber and management software to securely control the VM environment for operations and cyber attack management. The VES 148 generally runs on a hypervisor and a trusted computing platform. Many VMs 242, 244, 246, 248, 250, 252 may reside in the VES 148. VEs can support QR algorithms. Many VMs 242, 244, 246, 248, 250, 252 may reside in a datacenter (i.e., operating on multiple servers). VMs 242, 244, 246, 248, 250, 252 can securely communicate with other VMs 242, 244, 246, 248, 250, 252 inside or external to the datacenter 110. VMs 242, 244, 246, 248, 250, 252 operating as VEs 246, 248 may implement any type of encryption (e.g., Layer 1 Link, Layer 2 Ethernet, Layer 3 IP, etc.). ZT SW 244 provides continuous zero trust security monitoring and multi-level policy enforcement. Boot CR SW 270 monitors the secure boot operation of the computing platform and VMs. CR SW 242 monitors VM 242, 244, 246, 248, 250, 252 instances to prevent cyber attacks on the VMs 242, 244, 246, 248, 250, 252. The VMs 242, 244, 246, 248, 250, 252 are activated and accessed by crypto binding data in the form of user tokens 234, 240, 260. The SYS RoT 264 performs system hardware and software attestation and detects and reports anomalous system and VM behavior. It also authenticates and decrypts the content of VE 246, 248 instances.

VEs 246, 248 can be implemented in VMs in various ways to ensure failsafe operations. VEs 246, 248 can be run redundantly in separate VMs, one a primary VE and another a redundant VE where each monitors the result of the other for correctness. VEs 246, 248 can be implemented in a serial layered manner that double-encrypts data e.g., as done in Commercial Solutions For Classified (CSfC) methods. VEs 246, 248 can be monitored by machine learning (ML) or artificial intelligent (AI) functions.

The end user 256 is a remote cloud customer. The end user 256 can communicate with the secure datacenter 110 using an encrypted interface, such as through a hardware or virtual encryptor 258. The end user 256 can be a smartphone, laptop computer, desktop computer, server computer, smart appliance, smart vehicle, or the like.

The end user 256 (sometimes called a cloud customer) accesses information from the host VES 148 through an encrypted channel managed by encryptor 258 (e.g., a HWE or VE). Customer may be a secure lab site or any computing device end-point (e.g., a mobile device). The end user 256 can perform authentication to the secure datacenter 110 using a multi-factor authentication token (e.g., CIK, smart card, biometric, etc.).

The KMS 144 can digitally sign and encrypt an executable that is loaded and executed by a VM of the VMs 242, 244, 246, 248, 250, 252. The digitally signed and encrypted VM image can be verified to be from a trusted source, namely the U/OM 146, SYS RoT 264, CR SW 241, or ZT SW 244.

At deployment, the key authority 152 can provide seed keys in the form of trust anchors (TAs), private symmetric and private-public asymmetric key pairs to the KMS 144. The KMS 144 can provide the VES 148 with the seed keys. The seed keys are used to initialize HWEs, VEs and other encryption software. A unique user token 234, 240, 260 can be provided to each of the KMS 144, U/OM 146, and end user 256. Each user token 234, 240, 260 for a given user can be associated with metadata that includes a unique user identification (ID). Responsive to the secure datacenter 110 (e.g., the U/OM 146) receiving a request to perform an operation using the VES 148, it can verify that the user is to be trusted (e.g., by permissions checks, credentials checks, etc.). If the end user 256 is to be trusted, the request can be sent to the VES 148. In addition to the credentials check by the U/OM 146, the VES 148 can check user tokens 234, 240, 260 from the KMS 144, U/OM 146, and end user 256. The user tokens 234, 240, 260 can all be required for the VES 148 to operate one of the VMs 146 to perform the requested function. The VES 148 can perform key split reconstitution, hashing, digital signature verification, biometric or a different authentication operation on a combination of one or more of the user tokens 234, 240, 260. If (and only if) the result of the operation matches a result expected by the VES 148, will the VES 148 have the VE 246, 248 perform the requested operation.

Figure 3:
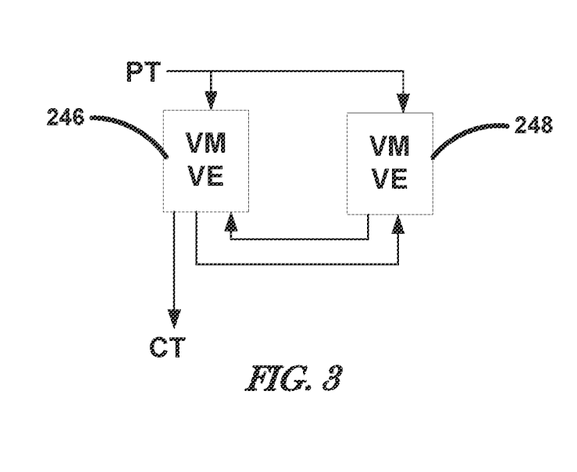
FIG. 3 illustrates, by way of example, a diagram of an embodiment of a redundant virtual machine (VM) VE configuration.
Figure 4:
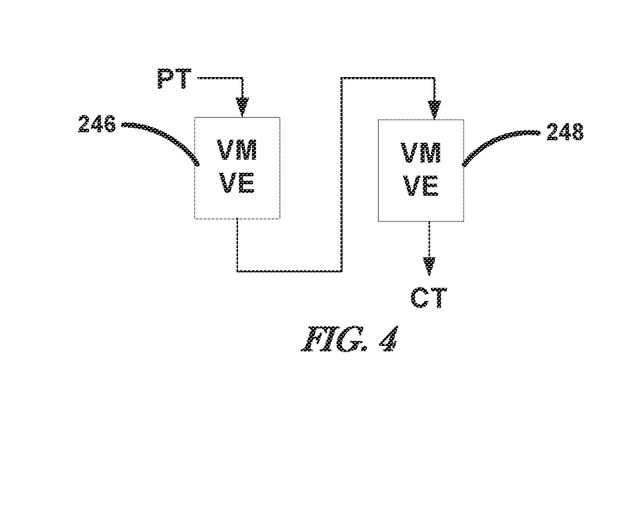
FIG. 4 illustrates, by way of example, a diagram of an embodiment of a diversity VM VE configuration.

FIG. 3 illustrates, by way of example, a diagram of an embodiment of a redundant VM VE configuration. FIG. 4 illustrates, by way of example, a diagram of an embodiment of a diversity VM VE configuration. The VNF 272 can directly connect the VMs 246, 248 to each other, such as by a virtual ethernet port or the like. In the redundant VM VE configuration of FIG. 3, plaintext (PT) unencrypted data is input to both VMs 246, 248. Both VM VEs perform the same encryption technique on the PT. The CT outputs are compared, such as by one or more of the VM VEs 246, 248. If error free, then the CT output from one of the VM VEs 246, 248 is used. In the diversity VM VE configuration of FIG. 4, PT is provided to one of the VM VEs 246, 248 using cryptographic algorithm A and the output goes into the other VM VE 248, 246 which performs a different cryptographic algorithm B on the encrypted data from the VM VE that performed cryptographic algorithm A. The doubly-encrypted CT is used as output. Both the diversity and the redundant VM VE configurations provide extra protection from leaking the PT. If one of the VM VEs 246, 248 is not properly encrypting the PT, there is a second VM VE 248, 246 that can operate to prevent the PT from leaking.

Figure 5:
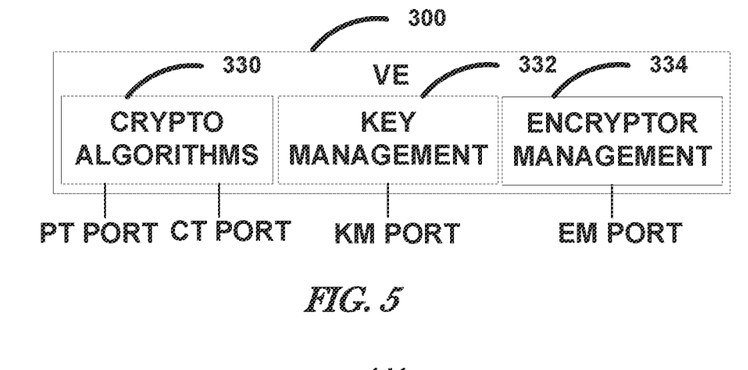
FIG. 5 illustrates, by way of example, a block diagram of an embodiment of a VE.

FIG. 5 illustrates, by way of example, a diagram of an embodiment of a VE 300. The VE 300 can be loaded onto and executed by a VM, such as the VM 246, 248. The VE 300 can include software crypto algorithms 330 that encrypt plaintext (PT) into ciphertext (CT) or decrypt CT into PT. Example crypto algorithm include the symmetric Advanced Encryption Algorithm (AES). A key management function 332 manages seed keys, TAs, mission keys, key splits, or the like to enable encryption, user authentication or verification. An encryptor management function 334 manages operational controls including the modes of the algorithms 330, selection of channels, resets and zeroization of keys. The management interfaces can have secure connections to the KMS 144 and U/OM 146.

Figure 6:
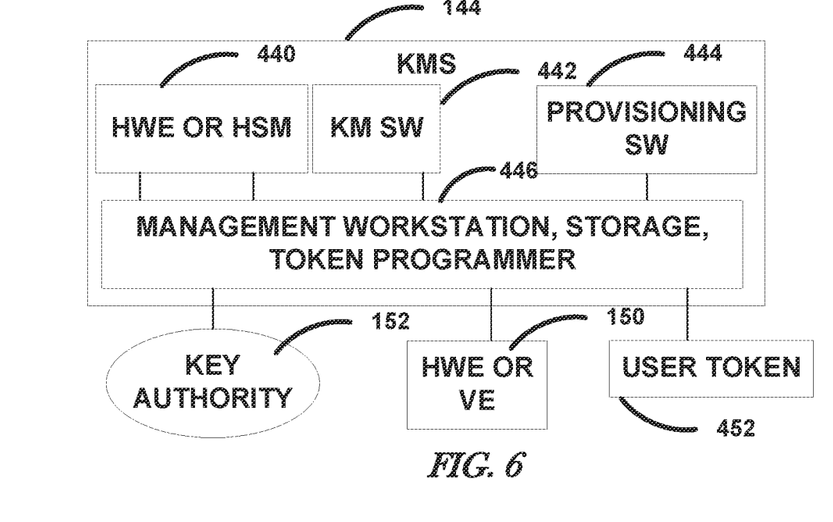
FIG. 6 illustrates, by way of example, a block diagram of an embodiment of a key management system (KMS).

FIG. 6 illustrates, by way of example, a diagram of an embodiment of the KMS 144. The KMS 144, as previously discussed, includes the HWE or HSM 440 which provides cryptographic functions and data storage for the key management software. The KMS 144 further includes key management software 442 that adds, deletes, updates, or otherwise manages keys in the workstation, storage, programmer 446. The KMS 144 includes provisioning SW 444 that performs the crypto provision operations 254 (see FIG. 2). The workstation, storage, programmer 446 hosts the SW 442, 444 and manages the operation of the HWE or HSM 440. The workstation, storage, programmer 446 programs a physical user token device 452 that can be plugged into a machine to provide the user token 234, 240, 260.

Figure 7:
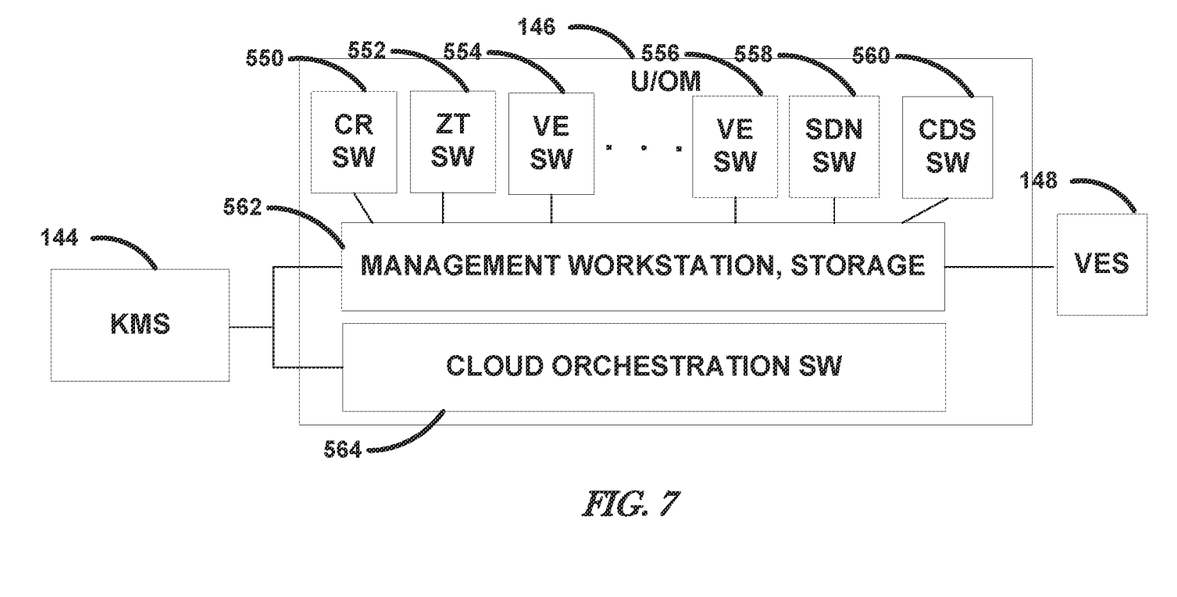
FIG. 7 illustrates, by way of example, a block diagram of an embodiment of an user and orchestration manager (U/OM).

FIG. 7 illustrates, by way of example, a diagram of an embodiment of the U/OM 146. The U/OM 146 includes images (executable files, sometimes called SW) that using IaC and cloud orchestration capabilities can be securely loaded onto and executed by a VM 242, 244, 246, 248, 250, 252. The SW illustrated in FIG. 7 includes command and control software for CR SW 550, ZT SW 552, VE SW 554, 556, SDN SW 558, CDS SW 560. The SW can be configured by the U/OM 146 to perform operations when executed by a corresponding VM 242, 244, 246, 248, 250, 252. The workstation, storage 562 can store and configure the SW, communicate with the KMS 144, and communicate with the VES 148 to perform operations for virtual secure cloud operations. The cloud orchestration SW 564 can implement the functionality of the U/OM 146 discussed herein.

Figure 8:
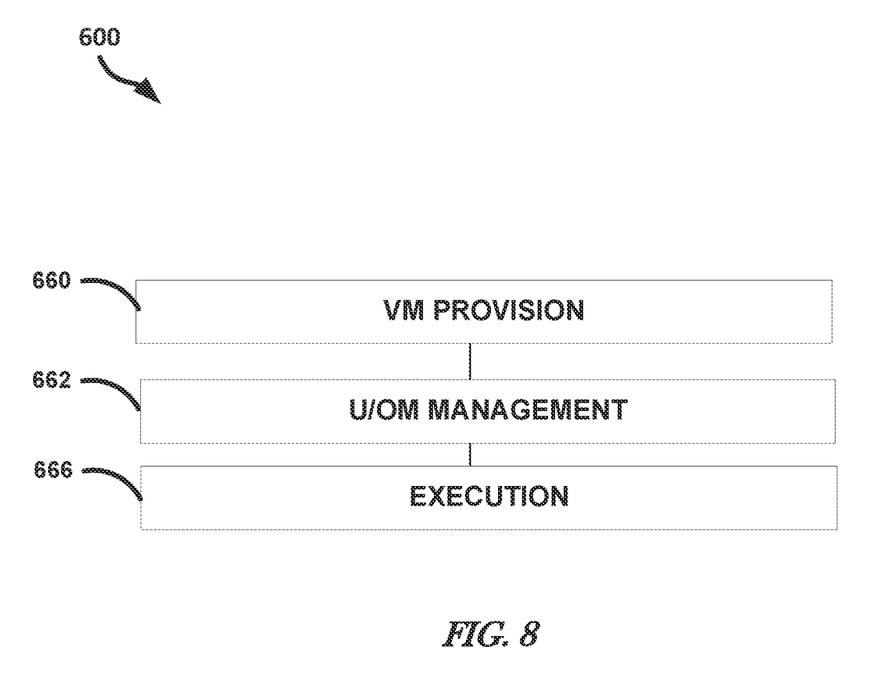
FIG. 8 illustrates, by way of example, a diagram of an embodiment of a method for HA VES operation.

FIG. 8 illustrates, by way of example, a diagram of an embodiment of a method 600 for HA VES operation. The method 600 as illustrated includes VM provisioning, at operation 660; U/OM management, at operation 662, and execution at operation 666.

The operation 660 can include the KMS 144 connecting to a source to receive initial mission Trust Anchors (TAs). The operation 660 can include the KMS 144 signing and encrypting VM 242, 244, 246, 248, 250, 252 images. The operation 600 can include the KMS 144 generating, signing, and encrypting user tokens 234, 240, 260. The operation 660 can include the KMS 144 sending token records to the U/OM 146. The operation 660 can include the KMS 144 sending TAs and bootloader key to the SYS RoT 264.

The operation 662 can include mission planning and configuration. The operation 662 can include network planning and configuration (SDN & SD-WAN). The operation 662 can include launching VMs 242, 244, 246, 248, 250, 252 in the VES 148. The operation 662 can include activating VMs 242, 244, 246, 248, 250, 252, such as by reconstituting key splits from token records. The operation 662 can include configuring multi-level zero trust software 244.

The operation 666 can include the KMS 144 managing VM 242, 244, 246, 248, 250, 252 initialization, mission, and infrastructure key material. The operation 666 can include the KMS 144 rekeying a VM 242, 244, 246, 248, 250, 252. The operation 666 can include the KMS 144 working with the U/OM 146 bringing up or tearing down VMs 242, 244, 246, 248, 250, 252. The operation 666 can include the U/OM 146 orchestrating cloud and SDN network operations. The operation 666 can include the U/OM 146 monitoring the zero trust software 244 and VMs 242, 244, 246, 248, 250, 252 for cyber attacks.

Figure 9:
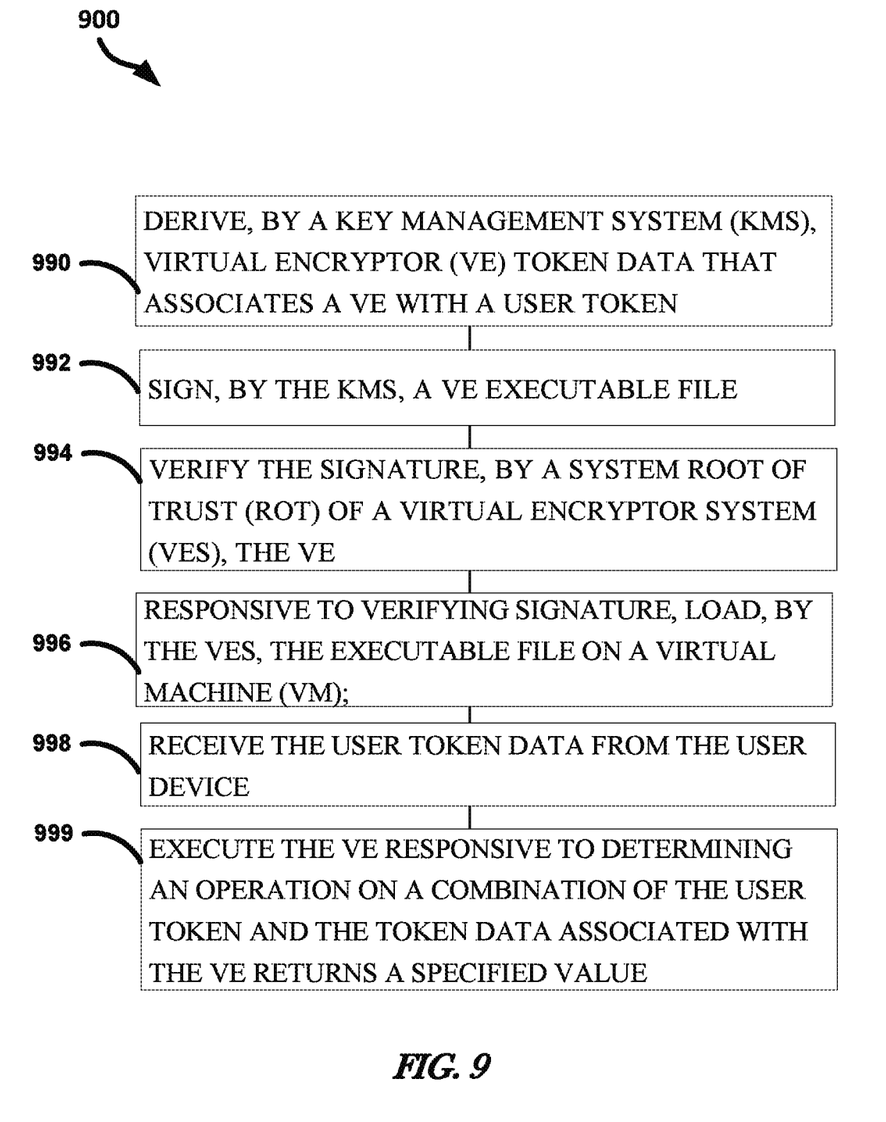
FIG. 9 illustrates, by way of example, a diagram of an embodiment of a method for HA VES provisioning and operation.

FIG. 9 illustrates, by way of example, a diagram of an embodiment of a method 900 for secure VE provisioning.

The method 900 as illustrated includes deriving, by a key management system (KMS), virtual encryptor (VE) token data that associates a VE with a user token, at operation 990; signing, by the KMS, a VE executable file, at operation 992; verifying the signature, by a root of trust (RoT) of a virtual encryptor system (VES), the VE, at operation 994; responsive to verifying signature, loading, by the VES, the executable file on a virtual machine (VM), at operation 996; receiving the user token data from the user device, at operation 998; and executing the VE responsive to determining an operation on a combination of the user token and the token data associated with the VE returns a specified value, at operation 999.

The method 900 can further include refraining from executing the VE responsive to verification failing. The method 900 can further include, wherein the executable file is further encrypted. The method 900 can further include, wherein the system RoT is a hardware RoT (HW RoT) or a software RoT (SW RoT). The method 900 can further include, wherein the user token is a smart card, Crypto Ignition Key (CIK), biometric device, or smart phone. The method 900 can further include, wherein the VE is one of a plurality of VEs executing on the VES, wherein two VEs of the plurality of VEs are configured in a redundant configuration or a diversity configuration. The method 900 can further include executing, by a second VM, zero trust security software, controlled by a user and operation management (U/OM), that provides multi-level zero trust security-focused monitoring and policy enforcement for VES hardware and software components. The method 900 can further include, wherein the system RoT by using cyber resilient software verifies the boot operation of the host computer and VM workload integrity monitoring. The method 900 can further include monitoring, by SDN and IaC software controlled by the U/OM, operations of the VES including software-defining which workloads and versions of algorithms get deployed on which VEs, where VEs get to run and for how long, and which VEs are visible to which user. The method 900 can further include monitoring, by cyber resilience software controlled by the U/OM, operations of the VES.

Embodiments provide an HA enterprise cloud system that provisions, launches, activates, and manages VEs (instantiated using VMs 242, 244, 246, 248, 250, 252). Embodiments manage key material for VEs using KMS 144 and U/OM 146 management servers in the datacenter 110. Embodiments can manage user activation tokens (e.g., in the form of a traditional CIK datakey, or can be smartcard, smartphone, or anything with storage capability). Embodiments can secure the VE VM 242, 244, 246, 248, 250, 252 environment and associated services and infrastructure via multi-level, cryptographic software, data, network, host, and network binding. Embodiments can provide orchestration of VEs through VMs 242, 244, 246, 248, 250, 252 with virtual network functions and/or in physical network functions (e.g., high-speed switches) to perform SDN orchestrated operations. This enables dynamic encrypted and SDN switched flows in any SDN network. Embodiment provide a capability for state-of-the-art cyber resilient technologies at both hardware and software level (via independent hardware & system root of trust capabilities) to continuously perform independent hardware and software attestation, mitigate hardware- and software-related supply chain risks, insider threats, and to also provide self-healing and decoy capabilities. Embodiment can incorporate multi-level zero trust security technologies across all pillars of zero trust (Identity, Devices, Networks, Workloads, and Data) to further cyber-harden U/OM 146 platform and its services.

Figure 10:
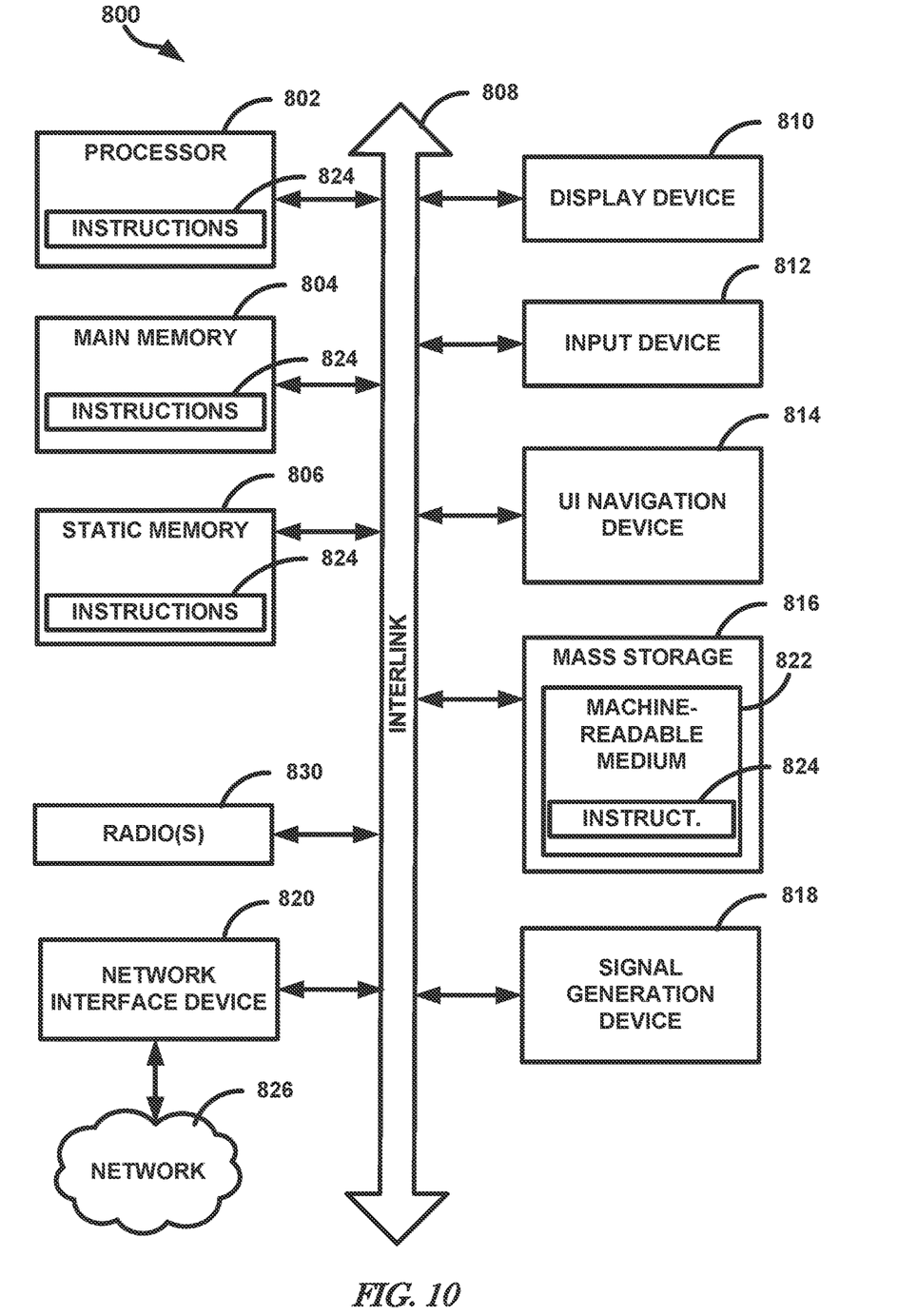
FIG. 10 illustrates, by way of example, a block diagram of an embodiment of a machine in the example form of a computer system within which instructions, for causing the machine to perform any one or more of the methods discussed herein, may be executed.

FIG. 10 illustrates, by way of example, a block diagram of an embodiment of a machine in the example form of a computer system 800 within which instructions, for causing the machine to perform any one or more of the methods discussed herein, may be executed. One or more of the secure datacenter 110, tenant devices 114, 116, 118, 130, 132, token access component 134, 136, 138, 140, 142, KMS 144, U/OM 146, VES 148, key authority 152, crypto provision operation 254, cyber resilient software 550, zero trust software 552, VMs 242, 244, 246, 248, 250, 252, SYS RoT 264, encryptor component 150, 152, 154, 156, 158, 160, 258, end user 256, method 600, method 700, or other device, component, operation, or method discussed can include, or be implemented or performed by one or more of the components of the computer system 800. In a networked deployment, the machine may operate in the capacity of a server or a client machine in server-client network environment, or as a peer machine in a peer-to-peer (or distributed) network environment. The machine may be a personal computer (PC), server, a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a mass storage unit 816, a signal generation device 818 (e.g., a speaker), a network interface device 820, and a radio 830 such as Bluetooth, Cellular, WWAN, WLAN, and NFC, permitting the application of security controls on such protocols.

The mass storage unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 824 may further be transmitted or received over a communications network 826 using a transmission medium. The instructions 824 may be transmitted using the network interface device 820 and any one of a number of well-known transfer protocols (e.g., HTTPS). Examples of communication networks include a local area network ("LAN"), a wide area network ("WAN"), the Internet, mobile telephone networks, Plain Old Telephone (POTS) networks, wireless data networks (e.g., WiFi and WiMax networks) and satellite communications networks. The term "transmission medium" shall be taken to include any intangible medium that is capable of storing, encoding, or carrying instructions for execution by the machine, and includes digital or analog communications signals or other intangible media to facilitate communication of such software.

ADDITIONAL NOTES AND EXAMPLES

Example 1 includes, a method for a secure virtual encryptor system, the method comprising deriving, by a key management system (KMS), virtual encryptor (VE) token data that associates a VE with a user token, signing, by the KMS, a VE executable file, verifying the signature, by a system root of trust (RoT) of a virtual encryptor system (VES), the VE, responsive to verifying signature, loading, by the VES, the executable file on a virtual machine (VM), receiving the user token data from the user device; and executing the VE responsive to determining an operation on a combination of the user token and the token data associated with the VE returns a specified value.

In Example 2, Example 1 further includes refraining from executing the VE responsive to verification failing.

In Example 3, at least one of Examples 1-2 further includes, wherein the executable file is further encrypted.

In Example 4, at least one of Examples 1-3 further includes, wherein the system RoT is a hardware RoT (HW RoT) or a software RoT.

In Example 5, at least one of Examples 1-3 further includes, wherein the user token is a smart card, Crypto Ignition Key (CIK), biometric device, or smart phone.

In Example 6, at least one of the Examples 1-5 further includes, wherein the VE is one of a plurality of VEs executing on the VES, wherein two VEs of the plurality of VEs are configured in a redundant configuration or a diversity configuration.

In Example 7, at least one of Examples 1-6 further includes executing, by a second VM, zero trust security software, controlled by a user and operation management (U/OM), that provides multi-level zero trust security-focused monitoring and policy enforcement for VES hardware and software components.

In Example 8, at least one of Examples 1-7 further includes, wherein the system RoT by using cyber resilient software verifies the boot operation of the host computer and VM workload integrity monitoring.

In Example 9, at least one of Examples 1-8 further includes monitoring, by software defined network (SDN) and infrastructure as code (IaC) software controlled by the U/OM, operations of the VES including software-defining which workloads and versions of algorithms get deployed on which VEs, where VEs get to run and for how long, and which VEs are visible to which user.

In Example 10, at least one of Examples 1-9 further includes monitoring, by cyber resilience software controlled by the U/OM, operations of the VES.

Example 11 includes a secure virtual encryptor system comprising a key management system (KMS) configured to derive virtual encryptor (VE) token data that associates a VE with a user token and sign a VE executable file, a root of trust (RoT) of a virtual encryptor system (VES) configured to verify the signature of the VE executable file, the VES configured to, responsive to verifying signature, load the executable file on a virtual machine (VM) of the VES, receiving the user token data from the user device, and executing the VE responsive to determining an operation on a combination of the user token and the token data associated with the VE returns a specified value.

In Example 12, Example 11 further includes, wherein the VES is further configured to refrain from executing the VE responsive to verification failing.

In Example 13, at least one of Examples 11-12 further includes, wherein the executable file is further encrypted.

In Example 14, at least one of Examples 11-13 further includes wherein the system RoT is a hardware RoT (HW RoT) or a software RoT.

In Example 15, at least one of Examples 11-14 further includes, wherein the user token is a smart card, Crypto Ignition Key (CIK), biometric device, or smart phone.

In Example 16, at least one of Examples 11-15 further includes, wherein the VE is one of a plurality of VEs executing on the VES, wherein two VEs of the plurality of VEs are configured in a redundant configuration or a diversity configuration.

In Example 17, at least one of Examples 11-16 further includes a second VM of the VES configured to execute zero trust security software, controlled by a user and operation management (U/OM), that provides multi-level zero trust security-focused monitoring and policy enforcement for VES hardware and software components.

In Example 18, at least one of Examples 14-17 further includes, wherein the system RoT is an HW RoT and wherein the HW RoT, by using cyber resilient software, verifies the boot operation of the host computer and VM workload integrity monitoring.

In Example 19, at least one of Examples 11-18 further includes a software defined network (SDN) and infrastructure as code (IaC) software controlled by the U/OM configured to monitor operation of the VES including software-defining which workloads and versions of algorithms get deployed on which VEs, where VEs get to run and for how long, and which VEs are visible to which user.

Example 20 includes a non-transitory machine-readable medium including instructions that, when executed by a machine, cause the machine to perform operations of the method or system of one of Examples 1-19.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have ben illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instance or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for a secure virtual encryptor system, the method comprising:
    deriving, by a key management system (KMS), virtual encryptor (VE) token data that associates a VE with a user token;
    signing, by the KMS, a VE executable file resulting in a signature;
    verifying the signature, by a system root of trust (RoT) of a virtual encryptor system (VES), the VE;
    responsive to verifying signature, loading, by the VES, the executable file on a virtual machine (VM);
    receiving the user token data from a user device; and
    executing the VE responsive to determining an operation on a combination of the user token and the token data associated with the VE returns a specified value.

2. The method of claim 1, further comprising refraining from executing the VE responsive to verification failing.

3. The method of claim 1, wherein the executable file is further encrypted.

4. The method of claim 1, wherein the system ROT is a hardware ROT (HW ROT) or a software RoT.

5. The method of claim 1, wherein the user token is a smart card, Crypto Ignition Key (CIK), biometric device, or smart phone.

6. The method of claim 1, wherein the VE is one of a plurality of VEs executing on the VES, wherein two VEs of the plurality of VEs are configured in a redundant configuration or a diversity configuration.

7. The method of claim 1, further comprising executing, by a second VM, zero trust security software, controlled by a user and operation management (U/OM), that provides multi-level zero trust security-focused monitoring and policy enforcement for VES hardware and software components.

8. The method of claim 4, wherein the system RoT by using cyber resilient software verifies a boot operation of a host computer and VM workload integrity monitoring.

9. The method of claim 1, further comprising monitoring, by software defined network (SDN) and infrastructure as code (IaC) software controlled by a user and operation management (U/OM), operations of the VES including software-defining which workloads and versions of algorithms get deployed on which VEs, where VEs get to run and for how long, and which VEs are visible to which user.

10. The method of claim 9, further comprising monitoring, by cyber resilience software controlled by the U/OM, operations of the VES.

11. A secure virtual encryptor system comprising:
    a key management system (KMS) configured to derive virtual encryptor (VE) token data that associates a VE with a user token and sign a VE executable file resulting in a signature;
    a root of trust (RoT) of a virtual encryptor system (VES) configured to verify the signature of the VE executable file;
    the VES configured to, responsive to verifying signature, load the executable file on a virtual machine (VM) of the VES;
    receiving the user token data from a user device; and
    executing the VE responsive to determining an operation on a combination of the user token and the token data associated with the VE returns a specified value.

12. The system of claim 11, wherein the VES is further configured to refrain from executing the VE responsive to verification failing.

13. The system of claim 11, wherein the executable file is further encrypted.

14. The system of claim 11, wherein the system ROT is a hardware ROT (HW ROT) or a software RoT.

15. The system of claim 11, wherein the user token is a smart card, Crypto Ignition Key (CIK), biometric device, or smart phone.

16. The system of claim 11, wherein the VE is one of a plurality of VEs executing on the VES, wherein two VEs of the plurality of VEs are configured in a redundant configuration or a diversity configuration.

17. The system of claim 11, further comprising a second VM of the VES configured to execute zero trust security software, controlled by a user and operation management (U/OM), that provides multi-level zero trust security-focused monitoring and policy enforcement for VES hardware and software components.

18. The system of claim 14, wherein the ROT is an HW ROT and wherein the HW ROT, by using cyber resilient software, verifies a boot operation of a host computer and VM workload integrity monitoring.

19. The system of claim 11, further comprising a software defined network (SDN) and infrastructure as code (IaC) software controlled by a user and operation management (U/OM) configured to monitor operation of the VES including software-defining which workloads and versions of algorithms get deployed on which VEs, where VEs get to run and for how long, and which VEs are visible to which user.

20. A non-transitory machine-readable medium including instructions that, when executed by a machine, cause the machine to perform operations for a secure virtual encryptor system, the operations comprising:
  causing a key management system (KMS) to derive virtual encryptor (VE) token data associating a VE with a user token;
  verifying, by a system root of trust (RoT) of a virtual encryptor system (VES), a signature of a virtual encryptor (VE) executable file, the VE;
  responsive to verifying signature, loading, by the VES, the executable file on a virtual machine (VM);
  receiving the user token data from a user device; and
  executing the VE responsive to determining an operation on a combination of the user token and the token data associated with the VE returns a specified value.

\* \* \* \* \*